Oct. 10, 1939.   H. J. GRAHAM   2,175,891
CONTROL SYSTEM
Filed Sept. 26, 1935

Base of Conducting Material

INVENTOR
Harold J. Graham
BY
M. Crawford
ATTORNEY

Patented Oct. 10, 1939

2,175,891

UNITED STATES PATENT OFFICE 2,175,891

CONTROL SYSTEM

Harold J. Graham, Boston, Mass., assignor to Westinghouse Electric & Manufacturing Company, East Pittsburgh, Pa., a corporation of Pennsylvania Application September 26, 1935, Serial No. 42,178

12 Claims. (Cl. 171—229)

My invention relates, generally, to control systems, and it has particular relation to systems for remotely controlling the operation of a direct-current generator.

When a direct-current generator is used for performing arc welding operations, or the like, it is often necessary to change its output capacity in order to provide for different welding currents, or to make adjustments in the setting of the machine necessitated by changes in the temperature of its windings. It has been the custom in the past, to make such changes by providing a control, such as a field rheostat, at the generator, and for the operator to return to the set to make each individual adjustment.

It is desirable to provide for effecting the desired change in control or setting of the field control mechanism of the generator without necessitating the operator's return to the set. In the past, systems have been used in which a control circuit has been provided along with the welding circuit, with suitable switches at the point where the welding operations are being performed to effect the desired control. The provision of the separate circuit, however, entails an additional complication in the added number of conductors, thereby causing an increase in the maintenance expense of the welding cable. If the control circuit is incorporated in the insulation of the welding cable, it is necessary to provide control switches in the handle of the electrode holder for effecting the desired control. This increases the bulkiness and weight of the electrode holder beyond that which may be desirable.

It is, therefore, an object of my invention to provide a system for remotely controlling the output capacity of a direct-current generator which shall be simple and efficient in operation and which may be readily and economically manufactured and installed.

The principal object of my invention is to provide for changing, from a remote position, the output capacity of an electric generator.

An important object of my invention is to provide for applying control frequency to the load circuit of a direct-current generator at a remote point to change its output capacity.

Another object of my invention is to provide for selectively applying one of two control frequencies to the load circuit of a direct-current generator to either increase or decrease its output capacity.

Still another object of my invention is to provide a small case containing one or more frequency generators, which may be connected to the load circuit of a direct-current generator for applying to the load circuit one or more control frequencies, by means of which frequency responsive equipment at the generator may be operated to change its output capacity.

Other objects of my invention will, in part, be obvious and, in part, appear hereinafter.

Accordingly, my invention is disclosed in the embodiment hereof shown in the accompanying drawing, and comprises the features of construction, combination of elements, and arrangement of parts, which will be exemplified in the construction hereinafter set forth, and the scope of the application of which will be indicated in the appended claims.

For a more complete understanding of the nature and scope of my invention, reference may be had to the following detailed description, taken in connection with the accompanying drawing in which.

Figure 1:
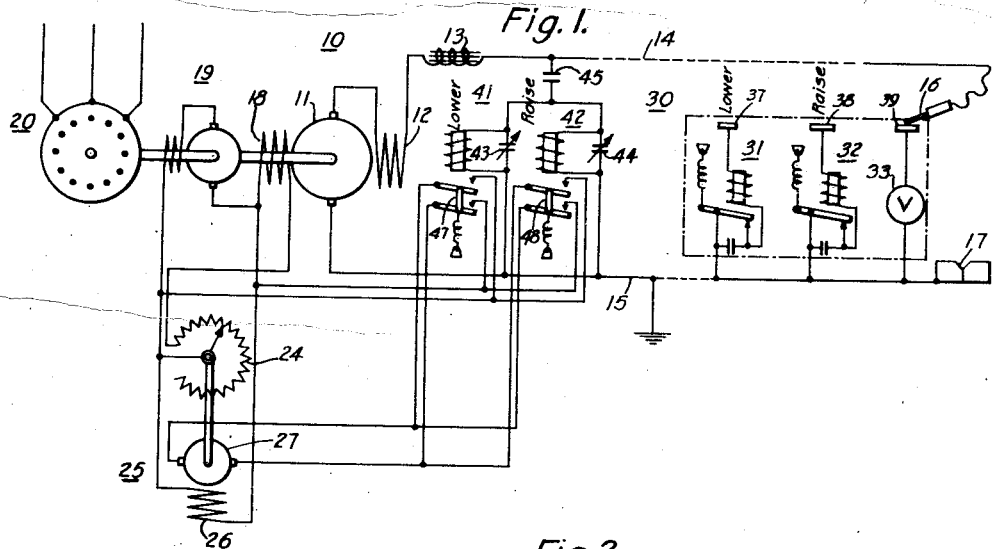
Figure 1 illustrates diagrammatically a remote control system organized in accordance with my invention.

Referring now particularly to Fig. 1 of the drawing, the reference character 10 designates, generally, a direct-current generator having an armature 11 which is arranged to supply current through a differential series field winding 12 and an inductor 13 to a load circuit comprising conductors 14 and 15. It will be observed that the load circuit comprising the conductors 14 and 15 is connected to supply current for performing arc welding operations, and that the conductor 14 is connected to a welding electrode 16, while the conductor 15 is connected to work 17 on which the welding operation is to be performed.

In order to control the output capacity of the generator 10, a main field winding 18 is provided which is arranged to be energized from an exciter-generator 19 of the series type. Both the generator 10 and the exciter-generator 19 are arranged to be driven, as illustrated, by means of an alternating-current motor, shown generally at 20. It will be understood, however, that any other suitable type of driving means may be employed to operate the generator 10 and the exciter-generator 19.

With a view to controlling the flow of exciting current through the main field winding 18 from the exciter-generator 19, a field rheostat 24 is provided, which may be operated by means of a driving motor, shown generally at 25. The motor 25 may be of the reversible type having a separately excited field winding 26 connected for energization across the output terminals of the exciter-generator 19, and an armature 27, the energizing connections for which will be described hereinafter. While the generator 10 is illustrated as being controllable by means of variations in the flow of current through the main field winding 18, it will be understood that other types of direct-current generators may be employed, in which other means are provided for effecting changes in the output thereof.

Figure 3:
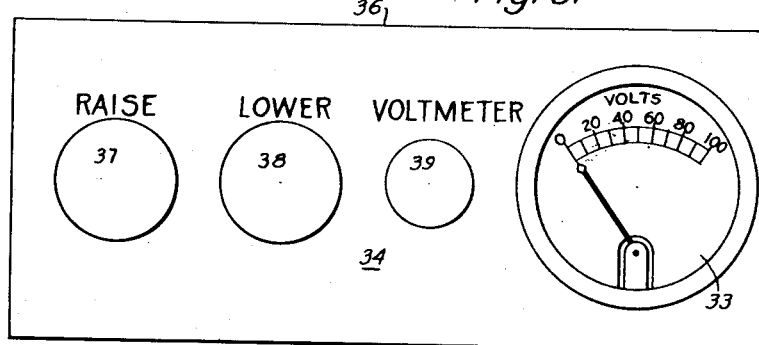
Fig. 3 is a top plan view of a case containing the control equipment to be carried by the welding operator.
Figure 4:
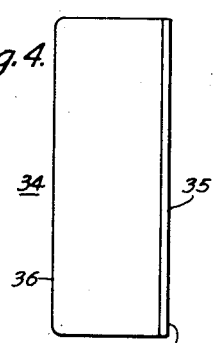
Fig. 4 is a view in end elevation of the case shown in Fig. 3.

As set forth hereinbefore, it is desirable in this embodiment of the invention to provide for controlling the setting of the field rheostat 24 from the position where the welding operation is being performed, so that it will be unnecessary for the operator to return to the generator 10 in order to make any desired adjustments. For this purpose, a controller, shown generally at 30, is provided, which includes frequency control generators 31 and 32 which may be of the buzzer type. In order to obtain an indication of the voltage existing across the load circuit comprising the conductors 14 and 15, a voltmeter 33 is also provided. It will be observed that one terminal of each of the frequency control generators 31 and 32, and one terminal of the voltmeter 33, are commonly connected to the conductor 15. These pieces of apparatus may be mounted in a case, shown generally at 34, Figs. 3 and 4, having a base 35 composed of conducting material, and a cover 36, preferably composed of an insulating material. The commonly connected terminals of the control frequency generators 31 and 32, and the voltmeter 33, may be interiorly connected to the base 35 which may be laid upon the work when it is desired to effect a change in the output capacity of the generator 10.

In order to selectively operate either of the control frequency generators 31 and 32 or the voltmeter 33, terminal buttons 37, 38 and 39 are provided individual to each of these pieces of apparatus, as illustrated. The electrode 16 may then be caused to engage any one of these terminal buttons to either effect of the desired control or to obtain an indication by means of the voltmeter 33 of the voltage existing between the conductors 14 and 15.

Since the control frequency generators 31 and 32 may be adjusted to generate separate and distinct frequencies and to apply them to the load circuit, control relays, shown generally at 41 and 42, are provided at the generator, which are arranged to be individually responsive, respectively, to the control frequency generators 31 and 32. This selectivity may be provided by means of adjustable capacitors 43 and 44 connected in parallel circuit relation, as illustrated, with the operating windings of the control relays 41 and 42. The control relays 41 and 42 are connected in parallel circuit relation and to the load circuit through a capacitor 45, which prevents the energization of the control relays, except upon the application of the control frequencies to the load circuit.

It will be observed that the control relays 41 and 42 are provided, respectively, with sets of movable contact members 47 and 48. When the control relay 41 is energized, as for example, when the welding electrode 16 is caused to engage the terminal button 37, the contact members 47 will be operated to complete an energizing circuit for the armature 27 of the rheostat motor 25 across the terminals of the exciter-generator 19. The motor 25 will then effect the operation of the rheostat 24 in a direction, for example, to increase the resistance connected in series circuit relation with the main field winding 18, and thereby to correspondingly decrease the output capacity of the generator 10.

In like manner, when the electrode 16 is caused to engage the terminal button 38, the control frequency generator 32 is energized and, since the control relay 42 is in a circuit which is tuned to the frequency generated by the control relay 32, only its contact members 48 will be operated to effect the energization of the armature 27 of the motor 25. It will be observed that the connections to the armature 27 of the rheostat motor 25 are now reversed from the connections which were provided when the contact members 47 of the control relay 41 were operated. The motor 25 will, therefore, operate in a reverse direction to decrease the resistance connected in series circuit relation with the main field winding 18, and consequently, the voltage applied to the load circuit by the generator 10 will be raised.

Figure 2:
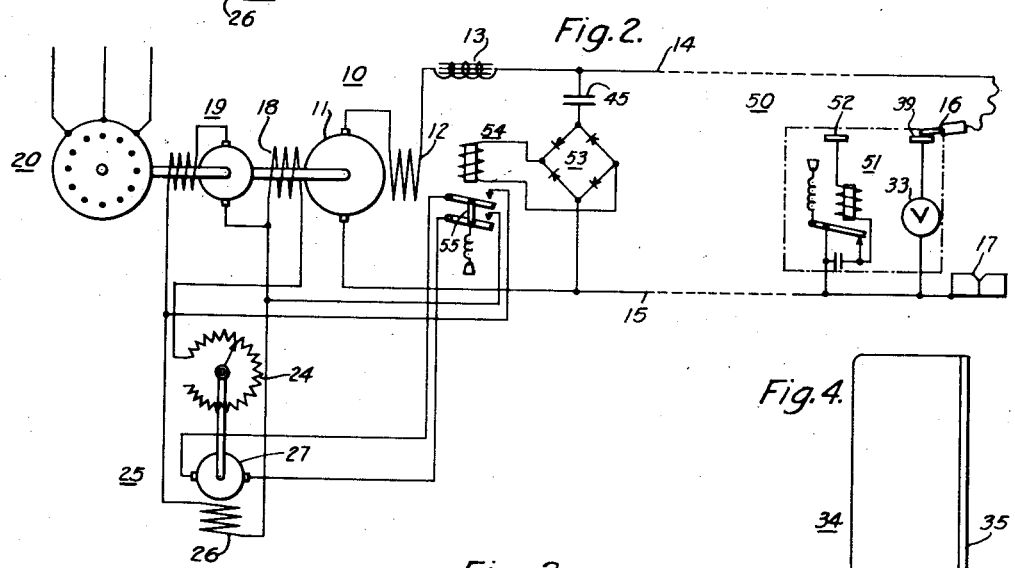
Fig. 2 illustrates diagrammatically a modification of the system illustrated in Fig. 1.

In the modification of the invention illustrated in Fig. 2 of the drawing, it will be observed that a controller 50 is provided at the welding position having a single control frequency generator 51, which is provided with a terminal button 52 for contact with the welding electrode 16. At the generator 10, a rectifier, shown generally at 53, and preferably of the copper-oxide type, is provided and connected in series circuit relation with the capacitor 45 across the load circuit comprising the conductors 14 and 15. The rectifier 53 serves to convert the control frequency into direct current for effecting the energization of the operating winding of a control relay 54. As shown, the control relay 54 is provided with contact members 55 which, on operation, serve to complete an energizing circuit for the armature 27 of the rheostat motor.

In this modification of the invention, the motor 25 is arranged to rotate in one direction only. The field rheostat 24 is also arranged for continuous rotation in one direction. When it is desired to effect a change in the output capacity of the generator 10 by changing the setting of the field rheostat 24, the operator places the controller 50 on the work, for example, and engages the terminal button 52 with the electrode 16. The control frequency generator 51 is then energized to apply the control frequency to the load circuit and to energize the control relay 54. The motor 25 is then caused to rotate the rheostat 24 to the desired setting.

In the event that the motor 25 rotates in such a direction as to increase the resistance connected in series circuit relation with the main field winding 18, and it is desired to lower the resistance connected in the circuit, it is then necessary to energize the motor 25 for a time sufficiently long to insert the entire resistance of the rheostat 24 in the circuit and to continue its operation until the operating arm of the rheostat 24 is in a position corresponding to its minimum resistance setting. The motor 25 may then be continuously energized until the desired setting of the rheostat 24 is obtained. While the modification of the invention employing only a single control frequency shown in Fig. 2 may require under certain conditions, a slightly longer time to effect the desired setting of the rheostat 24, it has the advantage that less equipment is employed, since only a single control frequency generator 51 and a single control relay 54 are required.

Since certain further changes may be made in the foregoing construction and different embodiments of the invention may be made without departing from the scope thereof, it is intended that all matter set forth in the foregoing description or shown in the accompanying drawing shall be considered as illustrative and not in a limiting sense.

I claim as my invention:

1. A remote control system comprising, in combination, a direct-current generator, a load circuit for the generator, field varying means for the generator, motor means operatively connected to said field varying means, control frequency generating means, means for connecting the control frequency generating means across said load circuit for energization to apply control frequency thereto, and frequency responsive means connected to said load circuit and disposed to initiate the operation of said motor means on application of control frequency to said load circuit to change the output of said direct-current generator.

2. A remote control system comprising, in combination, a direct-current generator, a load circuit comprising a pair of conductors for the generator, field varying means for the generator, motor means operatively connected to said field varying means, control frequency generating means, a case for carrying said control frequency generating means having a base composed of conducting material for engagement with one of said conductors and terminal means on the upper side disposed to be engaged by the other of said conductors, said control frequency generating means being connected between said base and said terminal means for applying control frequency to said load circuit, and frequency responsive means connected to said load circuit and disposed to initiate the operation of said motor means on application of control frequency to said load circuit to change the output of said direct-current generator.

3. A remote control system for a direct-current generator comprising, in combination, a load circuit for the generator, control means for increasing or decreasing the output of the generator, means disposed to be connected across the load circuit and energized therefrom when so connected for selectively applying two different control frequencies to said load circuit, and means selectively responsive to the application to said load circuit of said control frequencies for effecting the operation of said control means to increase the output of said generator on application of one of said control frequencies and to decrease the output of said generator on application of the other of said control frequencies.

4. A remote control system for a direct-current generator comprising, in combination, a load circuit for the generator, field varying means for the generator, reversible motor means having driving connection with said field varying means, means operable when connected to the load circuit for generating and applying two different control frequencies to said load circuit, a first frequency means connected to said load circuit and tuned to be responsive to one of said control frequencies for operating said motor means in one direction so long as said one control frequency is applied to increase the output of said generator, and a second frequency means connected to said load circuit and tuned to be responsive to the other of said control frequencies for operating said motor means in the opposite direction so long as said other control frequency is applied to decrease the output of said generator.

5. A system for remotely controlling the output of a direct-current generator provided with a rheostat for varying the flow of exciting current through its main field winding comprising, in combination, a load circuit for the generator, a reversible motor operatively connected to said rheostat, a source of power for the reversible motor, a pair of control frequency generators disposed to be connected to the load circuit for energization and operable to apply two different control frequencies to said load circuit, means tuned to be responsive to one of said control frequencies for effecting the connection of said motor to its power source for operation in a forward direction, and means tuned to be responsive to the other of said control frequencies for effecting the connection of said motor to its power source for operation in a reverse direction.

6. A system for remotely controlling the output of a direct-current generator provided with a rheostat for varying the flow of exciting current through its main field winding comprising, in combination, a load circuit for the generator, a reversible motor operatively connected to said rheostat, a pair of control frequency generators, a case for carrying said generators having a base composed of conducting material for engagement with one terminal of said load circuit and a pair of buttons of conducting material on the upper side for selective connection to the other terminal of said load circuit, said control frequency generators being commonly connected to said base and individually connected to said buttons, means tuned to be responsive to one of said control frequencies for effecting the operation of said motor in a forward direction, and means tuned to be responsive to the other of said control frequencies for effecting the operation of said motor in a reverse direction.

7. A remote control system comprising, in combination, a direct-current generator disposed to be connected to a load circuit, a main field winding in said generator, a rheostat connected to vary the exciting current in said field winding, motor means connected to said rheostat and disposed to operate it in one direction only, frequency generating means operable when connected to the load circuit for applying a control frequency to said load circuit, and means including a rectifier connected across the load circuit and a relay energized therefrom disposed to be responsive to the control frequency applied to said load circuit for effecting the operation of said motor means.

8. A remote control system comprising, in combination, a direct-current generator connected to energize a load circuit, a main field winding in said generator, a rheostat connected to vary the exciting current in said field winding, a motor having driving connection with said rheostat for rotating it in only one direction, a control frequency generator, means for connecting the control frequency generator for energization across said load circuit to apply a control frequency thereto, and means disposed to be responsive to the application of said control frequency to said load circuit for effecting the operation of said motor.

9. A remote control system comprising, in combination, a direct-current generator connected to energize a load circuit comprising a pair of conductors, a main field winding in said generator, a rheostat connected to vary the exciting current in said field winding, a motor having driving connection with said rheostat for rotating it in only one direction, a control frequency generator, a case for carrying said control frequency generator having a base composed of conducting material for engagement with one of said conductors and a terminal on the upper side disposed to be engaged by said other conductor, said control frequency generator being connected between said base and said terminal for applying a control frequency to said load circuit, and means disposed to be responsive to the application of said control frequency to said load circuit for effecting the operation of said motor.

10. The combination with a direct current generator and a load circuit therefor, of means operable to vary the output of the generator, means operable when connected to said load circuit to be energized therefrom for generating and applying a control frequency in said load circuit, and means connected to the load circuit and responsive to the control frequency applied to said load circuit for effecting the operation of the output varying means of the generator.

11. In combination, a direct current generator provided with means for varying its output, a load circuit connected to the generator, electrically-operable means for operating the output varying means of the generator, control frequency generating means operable when energized by connecting it across the load circuit for applying a control frequency thereto, and relay means connected across the load circuit and responsive to the control frequency applied thereto for effecting the energization of the electrically-operable means for operating the output varying means of the generator.

12. In combination, a direct current generator having a field winding, an exciter for the field winding, means for driving the generator and exciter, circuit means including a rheostat connecting the field winding to the exciter, electro-responsive means for actuating said rheostat, relay means connected across the load circuit and selectively responsive to different control frequencies applied to the control circuit for effecting the operation of the electro-responsive means to operate the rheostat in opposite directions to increase and decrease the excitation of the field winding of the generator, and control frequency generating means selectively operable when connected to the load circuit to be energized therefrom for applying different control frequencies to the load circuit to selectively operate said relay means.

HAROLD J. GRAHAM.